(12) United States Patent
Frigeri et al.

(10) Patent No.: US 7,806,042 B2
(45) Date of Patent: Oct. 5, 2010

(54) APPARATUS AND METHOD FOR THE PREPARATION OF HOT BEVERAGES BY BREWING A WATER-EXTRACTABLE PARTICULATE SUBSTANCE

(75) Inventors: Patrizio Frigeri, Uster (CH); Roland Kaelin, Einsiedeln (CH); Rainer Bunge, Zurich (CH)

(73) Assignee: Imel AG (CH)

( * ) Notice: Subject to any disclaimer, the term of this patent is extended or adjusted under 35 U.S.C. 154(b) by 740 days.

(21) Appl. No.: 11/738,646

(22) Filed: Apr. 23, 2007

(65) Prior Publication Data

US 2007/0245902 A1 Oct. 25, 2007

(30) Foreign Application Priority Data

Apr. 25, 2006 (CH) .................................. 00686/06

(51) Int. Cl.
*A47J 31/00* (2006.01)
(52) U.S. Cl. ...................... 99/287; 99/289 R; 99/302 R
(58) Field of Classification Search .................. 99/287, 99/289 R, 297, 302 R, 303, 302 P, 495, 516; 100/117, 118, 145; 366/266, 310, 318, 323
See application file for complete search history.

(56) References Cited

U.S. PATENT DOCUMENTS

| | | | |
|---|---|---|---|
| 1,055,475 A * | 3/1913 | Koolman et al. .............. 99/278 |
| 3,357,339 A | 12/1967 | Schabb | |
| 3,992,983 A * | 11/1976 | Gasser et al. ................. 99/287 |
| 5,476,550 A * | 12/1995 | Walker .......................... 127/2 |
| 6,251,193 B1 * | 6/2001 | Rossy et al. ................... 127/2 |

FOREIGN PATENT DOCUMENTS

| | | |
|---|---|---|
| JP | 05292884 | 11/1993 |
| WO | WO2005117669 | 12/2005 |

\* cited by examiner

*Primary Examiner*—Reginald L Alexander
(74) *Attorney, Agent, or Firm*—Maginot, Moore & Beck, LLP (57) ABSTRACT

An apparatus for the preparation of hot beverages by brewing a water-extractable particulate substance includes a delivery pump (5), water heater (6), brewing area (36) and beverage outlet (7). The apparatus comprises a delivery member in the form of a screw shaft (10) provided with at least one flight (13) by means of which the particulate substance is delivered into and out of the brewing area (36) in one and the same direction. An extraction area (37) is provided downstream of the brewing area (36) in which the substance is compacted by the screw shaft (10) and thereby the essence of the substance extracted or the substance is additionally extracted. This is achieved by the pitch of the flights (13) in the region of the extraction zone (25) being smaller than in the region of the brewing zone (24).

18 Claims, 4 Drawing Sheets

APPARATUS AND METHOD FOR THE PREPARATION OF HOT BEVERAGES BY BREWING A WATER-EXTRACTABLE PARTICULATE SUBSTANCE

BACKGROUND OF THE INVENTION

The invention relates to an apparatus and method for the preparation of hot beverages by brewing a water-extractable particulate substance for preparing hot beverages and particularly for the efficient continual preparation and brewing of such beverages.

Devices of the kind involved in this case serve to prepare hot beverages such as, for example, espresso coffee fully automatically. An espresso coffee is a coffee beverage, in the preparation of which the coffee powder is subjected to a pressurized flow of brew water. For the preparation of a serving of fresh espresso coffee generic devices feature a grinder by means of which the quantity of coffee beans needed for the preparation of a serving of coffee can be freshly ground each time. The ground coffee beans are then fed in batches as coffee powder to a brewing chamber or brewing area where the coffee powder is first compacted before being subjected to a pressurized flow of brew water in a predefined quantity for extraction.

Depending on the quantity of brew water used for extraction of the coffee powder accommodated in the brewing chamber a very small to a very large beverage serving can be prepared and directed into a corresponding receptacle. The quantity of the substance—the coffee powder—used in the preparation of each beverage serving varies, if at all, only on a small scale since the volume of the brewing chamber is predefined and cannot accommodate just any large or differing quantity of substance or coffee powder, meaning, in other words, that for a so-called espresso, for the preparation of which significantly less than 100 ml water is used, practically the same quantity of coffee powder is employed as for the preparation of a so-called extended coffee, for example a milk coffee for the preparation of which it may very well be that several 100 ml of water are used. On top of this, the maximum quantity of brew water used for the preparation of a beverage is limited since from a predefined maximum quantity of substance to be brewed not just any large quantity of a high-quality tasty serving of coffee can be prepared. In the preparation of such a coffee beverage the proportion of soluble ingredients, particularly colorants, flavourings and aromatics becomes successively diminished in the coffee powder which particularly in the preparation of an espresso coffee is a drawback since the coffee beverage flowing from the beverage outlet is dark to black in color at the start of preparation whilst towards the end of preparation just a colorless liquid flows from the beverage outlet. Another drawback is that the longer the extraction duration the poorer the taste of the beverage becomes and the quantity of dissolved caffeine is increased.

Known from JP05292884A is an apparatus having an inclined screw conveyor, whereby the coffee powder is extracted in a continual counterflow. In this arrangement the water is supplied at the highest point of the conveyor before flowing through a trough in the conveyor downwards whilst the coffee powder is conveyed by the screw upwards. This apparatus as described works totally non-pressurized and roughly corresponds to the filtration of extended or American coffee. The filter time is dictated by the length of the conveyor screw and cannot be varied. In the method implemented by such an apparatus the coffee is bitter tainted and also unhealthy attendant substances such as e.g. caffeine is included in the brew to a large extent.

Described in U.S. Pat. No. 3,357,339 is an automatic coffee maker for the continual preparation of coffee. The coffee powder for extraction is held in a closed tubular tape made of a water-permeable filter material. To produce a coffee beverage the tape is continually passed through a brewing chamber where by means of a spray head located above the tape hot water is finely dispersed so that the tape including its content is wetted. The wetted tape is then passed through two extractor rolls, resulting in the essence of the coffee powder being extracted. Located below the two extractor rolls is a discharge funnel via which the coffee beverage is directed into a receptacle.

Described in WO 2005/117669 is a method and an apparatus, namely a coffee machine, for preparing a single serving of a beverage. As it reads from a first disclosed embodiment the coffee machine comprises, among other things, a bean container, below which a grinder is located, a feeder as well as a grounds carrier in the form of a circulating water-permeable conveyor belt. The grounds carrier conveys the ground coffee powder into an extraction portion in which the conveyor belt is supported by a filter plate. In the extraction portion the coffee powder is, on the one hand, compressed by means of a compression belt and, on the other hot water is supplied for the extraction of the coffee powder. In the direction of delivery the compression belt is slightly inclined to the conveyor belt, resulting in increasing compression of the coffee powder. The extracted coffee powder is transferred by means of the conveyor belt into a waste bin. The intention of this apparatus is to permit continual preparation of a coffee beverage. In an alternative example embodiment it is proposed to provide two conveyor belts for conveyance, provided with a plurality of partitions. The two conveyor belts pass between two plates in passing through the extraction portion. These partitions are intended to form chambers for receiving the aromatic—coffee powder—and for extraction thereof. In some of the further example embodiments the conveying member is configured as a screw conveyor each provided with helical flights of constant pitch. In one example to create discrete chambers for receiving the aromatic a slotted caterpillar-type track is proposed, engaging the helical flights of the screw conveyor.

In another example disclosed in this publication, a dual screw conveyor is proposed, the helical flights of which interengage to create the discrete chambers. In conclusion, screw conveyors are also proposed, the core of which changes in diameter, namely becoming flared into a compacting cone. The intention here is to diminish the screw space between the core, the helical flights and the tubular wall encasing the screw conveyor so that an aromatic conveyed by means of the screw conveyor is compacted in the direction of delivery. Where compaction occurs in the extraction portion, a seal location needs to be created to prevent the aromatic being wetted before the seal location. When compaction occurs downstream of the extraction portion the aromatic can be extracted thereby. In these examples too, the helical flights always feature a constant pitch.

SUMMARY OF THE INVENTION

In one embodiment, an apparatus is proposed that includes a screw shaft extending along at least a brewing zone and an extraction zone downstream of a brewing zone. The shaft includes flights wherein the pitch of the flights in the extraction zone is smaller than the pitch of the flights in the brewing zone. Since the screw shaft extends at least along the brewing zone as well as along the extraction zone and the pitch of flights in the region of the extraction zone is smaller than in the region of the brewing zone, compacting the coffee powder in the extraction zone and extracting the essence is now achieved particularly to advantage.

In another preferred embodiment it is proposed that the apparatus comprises an intake zone in which the housing encasing the screw shaft is conically tapered, the screw shaft featuring an intake portion adapted to the contour of the intake zone. This meets the basic requirement that the delivery of the screw shaft can be varied by axial displacement relative to the housing.

In accordance with a further embodiment of the invention, a method for preparation of a hot beverage is characterized in that a particulate substance delivered downstream of the brewing zone into a sealing area is compacted axially and its essence thereby extracted.

One object of the invention is to sophisticate an apparatus for the preparation of hot beverages by brewing a water-extractable particulate substance such that the quantity or volume of a beverage serving to be prepared is freely selectable over a broad range whilst maintaining the simple configuration of the apparatus in being suitable for preparation of a high-quality beverage.

Other objects and benefits of the invention may be discerned from the following written description and accompanying figures.

DESCRIPTION OF THE FIGURES

Example embodiments of the invention will now be detailed with reference to the drawing in which.

DESCRIPTION OF THE ILLUSTRATED EMBODIMENTS

Figure 1:
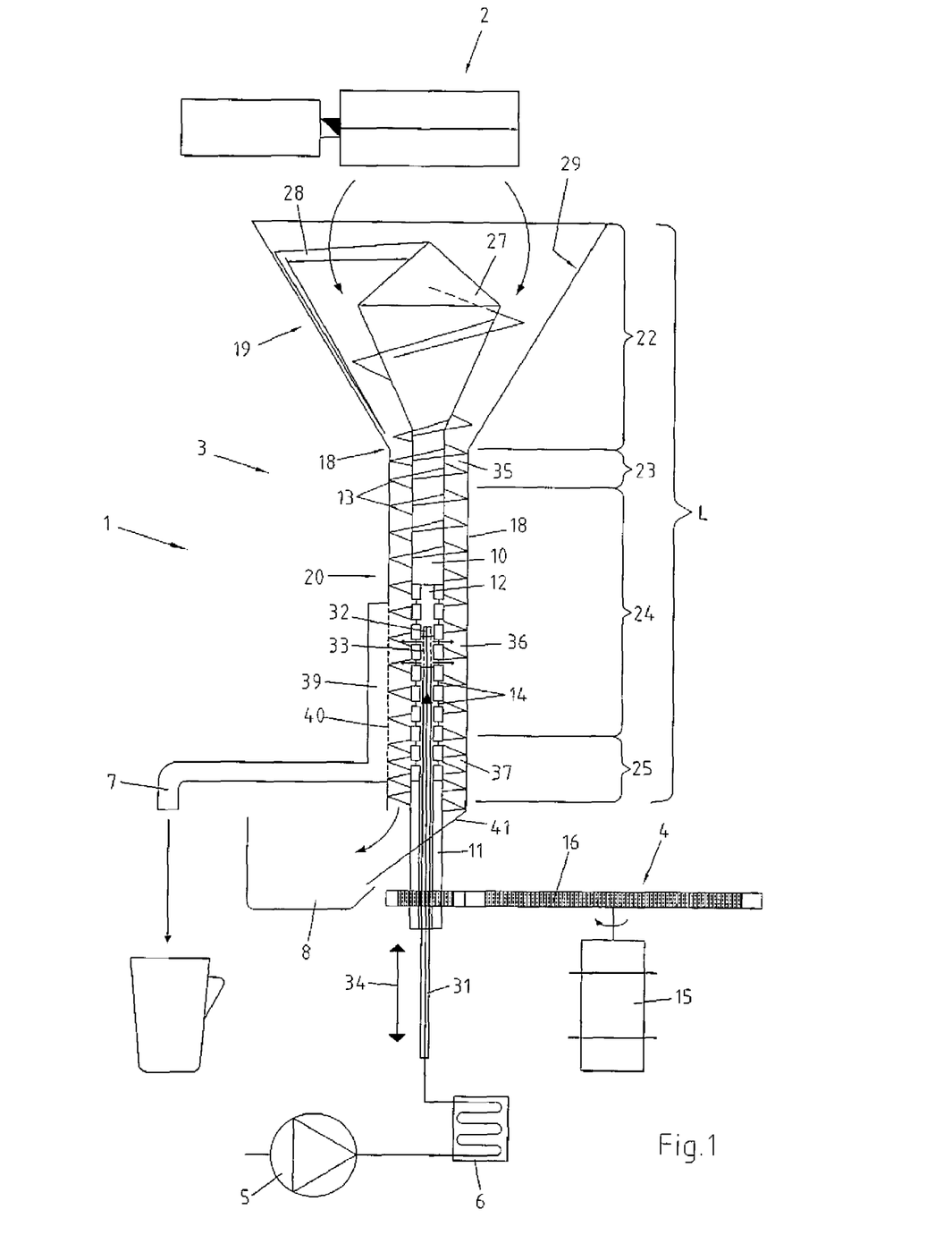
FIG. 1 is a diagrammatic illustration of an apparatus for the preparation of hot beverages.

Referring now to FIG. 1 there is illustrated diagrammatically an apparatus for the preparation of hot beverages by brewing a water-extractable particulate substance which in this case is for example a coffee maker for the preparation of espresso coffee in which the coffee powder is subjected to a pressurized through-flow of brew water.

The apparatus 1 as shown comprises a grinder 2, a brewer 3, a drive 4, a delivery pump 5, a water heater 6, a beverage outlet 7 as well as a bin 8 for spent coffee grounds. The water heater 6 is preferably configured as a continuous flow type water heater, although, of course, it is just as possible to use a boiler. The apparatus 1 comprises furthermore a coffee bean receptacle which, however, is not shown so as not to clutter up the illustration. Likewise not shown is source of tap water for obtaining the brew water.

The brewer 3 comprises a hollow screw shaft 10 rotatably mounted in a housing 18, the actual screw shaft member 11 being extended in length beyond the housing 18. Serving to drive the screw shaft 10 is the drive 4 comprising a drive motor 15 as well as a gearing 16 connected to the screw shaft 10, the gearing 16 being connected to the portion of the screw shaft member 11 extending beyond the housing 18. The housing 18 includes of a funnel-shaped inlet portion 19 as well as a cylindrical portion 20, the housing 18 and screw shaft 10 respectively being divided over the length L into zones 22, 23, 24, 25 as detailed below.

The delivery member in the form of the screw shaft 10 features flights 13 serving to forward the coffee powder and which axially—i.e., in the direction of delivery—comprises differing pitches to create at least three different zones 23, 24, 25 along the cylindrical housing portion 20. In the region of the funnel-shaped inlet portion 19 the screw shaft 10 is provided with a widened starting portion 27 configured in the form of a dual cone at which a radially projecting wiper 28 is arranged which on rotation of the screw shaft 10 wipes along the inner edge 29 of the funnel-shaped inlet portion 19. To form an intake zone 22 the flights 13 feature at the start—i.e., in the funnel-shaped inlet portion 19—a large pitch to forward the coffee powder delivered from the grinder 2 into the funnel-shaped inlet portion 19 with a high feed in the direction of the cylindrical housing portion 20. At the start of the cylindrical housing portion 20 the flights 13 of the screw shaft 10 feature a low pitch to form a sealing zone 23. This sealing zone 23 extends preferably over one to three flights. The coffee powder is strongly compacted by the flights 13 in this sealing zone 23.

The sealing zone 23 is followed by the actual brewing zone 24 in which the flights 13 of the screw shaft 10 feature a larger pitch than that of the sealing zone 23 so that the coffee powder can slightly decompress again in this brewing zone 24. Adjoining the outlet end of the brewing zone 24 is the extraction zone 25 in which the flights 13 of the screw shaft 10 in turn feature a smaller pitch than that of the brewing zone 24. Due to this smaller pitch of the flights 13 the already partly extracted coffee powder is additionally compacted in the extraction zone 25, as a result of which, for one thing, an additional extraction of the coffee powder is achieved and, for another, a sealing for the brew water flowing through the brewing area 36 is created so that the brewing zone 24 is sealed off at the outlet end.

Formed between the inner side of the housing 18 and the screw shaft member 11 along the three zones 23, 24, 25 are a sealing area 35, a brewing area 36 and an extraction area 37. The volume of the brewing area 36 provided for the actual extraction of the coffee powder is selected such that only a fraction of the quantity of substance—coffee powder—needed for brewing a serving of a beverage can be accommodated therein. To prepare a serving of coffee, namely a small cup of espresso or a conventional cup of coffee approximately 7 to 9 grams of coffee powder are normally used. The brewing area 36 is thus preferably configured to accommodate approximately 1.5 to a maximum of 3 grams of coffee powder. Providing a comparatively small brewing area has, among other things, the advantage that a consistent extraction of the coffee powder accommodated in the brewing area is assured. The other advantages afforded by a small-volume brewing area are detailed further on.

The outlet of the water heater 6 is connected to the brew water conduit 31 which leads into the hollow interior 12 of the screw shaft 10 and is provided in the end portion 32 with several radially outlets 33 via which brew water can inflow from the brew water conduit 31 into the interior 12 of the screw shaft 10. The hollow screw shaft member 11 is provided with radial passageways 14 which are preferably configured as drillings and are arranged along the brewing zone 24 and of the extraction zone 25 and lead from the hollow interior 12 of the screw shaft 10 to the outer shell of the screw shaft 10 in connecting the interior 12 of the screw shaft 10 to the actual brewing area 36 so that the brew water delivered by means of the delivery pump 5 and heated by the water heater 6 can inflow via the brew water conduit 31 into the interior 12 of the screw shaft 10 and from there via the passageways 14 in the screw shaft member 11 radially, i.e., transverse to the direction of delivery into the brewing area 36. The brew water conduit 31 is axially displaceable relative to the screw shaft 10 as is also indicated by a double arrow 34. Axial displacement of the brew water conduit 31 permits inflow of the brew water, where necessary, at the different locations into the brewing area 36.

The brew water is introduced into the brewing zone 24 or brewing area 36 preferably with a pressure of approximately 5 to 20 bar. Due to compaction of the coffee powder in the extraction zone 25 at the outlet end a higher hydrostatic pressure normally exists in this section than in the brewing zone 24 or in the brewing area 36. Feeding the brew water in the region of the brewing zone 24 has the advantage that in this zone the coffee powder is compacted hardly at all or only slightly. This is why the brew water can be fed into the region of the brewing zone 24, where necessary, practically non-pressurized or with just a slight pressure. The situation is different when the brew water is fed in a region in which the coffee powder is highly compacted. In this case the brew water must be introduced at a relatively high pressure into the coffee powder so that efficient and thorough wetting of the coffee powder is assured.

The diameter of the radial passageways 14 is preferably selected so that it is smaller than the statistical average of the diameter of a single particle of the coffee powder in thus preventing that the individual particles of coffee gain access to the interior 12 of the screw shaft 10. Where necessary, radial passageways having a larger diameter may also be provided, the passageways in this case needing to be covered preferably by a fine mesh filter as is already state of the art today in coffee filtering.

The housing 18 is provided at the side facing the beverage outlet 7 with a collecting section 39 which at the inner side facing the screw shaft 10 features a filter-type wall part 40 surrounding the screw shaft 10 at least in part and via which the freshly brewed coffee beverage can radially emerge from the brewing area 36. The filter-type wall part 40 may be configured as a conventional curved perforated plate, instead of a perforated plate a ceramic filter or a so-called spring-loaded filter may be put to use, for example. The used coffee grounds are ejected at the end axially from the housing 18 and directed by means of a baffle 41 into the bin 8.

Preferably the apparatus is provided with a valve by means of which after preparation of a serving of coffee or between preparation of two servings any dribble of the coffee from the beverage outlet can be stopped.

Figure 2:
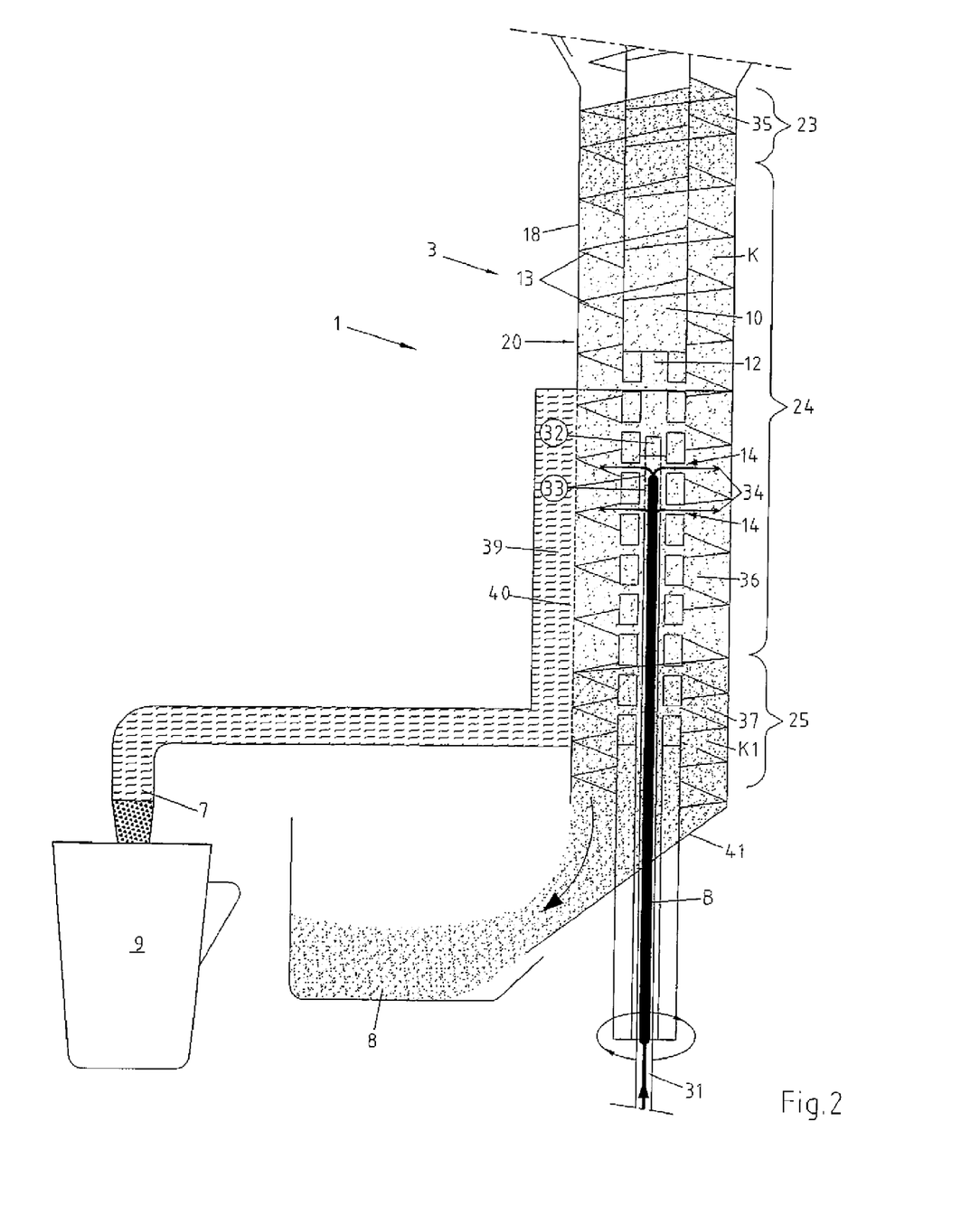
FIG. 2 is a section taken from FIG. 1 on a magnified scale.

Referring now to FIG. 2 there is illustrated a section of the apparatus on a magnified scale in the region of the cylindrical housing portion 20 with the aid of which the actual process for preparation of the beverage will now be detailed, assuming that at the start of the preparation process no coffee powder is in the housing 18 or in the various zones 23, 23, 24, 25. The preparation process starts by grinding fresh coffee beans by means of the grinder. The coffee powder is conveyed by means (not shown) into the funnel-shaped inlet zone where it is taken up by the flights 13 of the rotating screw shaft 10 and conveyed into the cylindrical housing portion 20. As soon as the coffee powder K has been conveyed from the screw shaft 10 up to the extraction zone 25 at the outlet end or the extraction area 37 is filled with highly compacted coffee powder K1, brewing can be started since the brewing area 36 is sealed off axially at both ends by the highly compacted coffee powder in the sealing zone 23 as well as in the extraction zone 25.

Rotation of the screw shaft 10 feeds brew water B at a temperature of approximately 90 to 95° C. and a pressure of approximately 5 to 20 bar via the brew water conduit 31, the brew water B flowing in the end portion 32 of the brew water conduit 31 via the outlets 33 into the interior 12 of the screw shaft 10 and from there via the passageways 14 in the screw shaft member 11 into the brewing area 36 as indicated by double arrow 34. The brew water is distributed in the brewing area 36, it being namely prevented by the strongly compacted coffee powder in the sealing zone 23 and extraction zone 25 respectively from gaining access axially to the sealing zone 23 and extraction zone 25 respectively. The brew water can, however, flow axially upwards in the direction of the sealing zone 23 to at least wet the coffee powder K in the upper or inlet side region of the brewing zone 24, as a result of which the coffee powder K in this region can swell and be introduced into a kind of pre-brew phase which is of advantage for the taste of the beverage to be prepared. The continual movement of the coffee powder K axially through the brewing area 36 results in the brew water introduced radially into the brewing area 36 flowing through the brewing area 36 not absolutely radial but instead inclined.

The brew water B supplied via the brew water conduit 31 flows through the brewing area 36 and thus also the coffee powder K substantially radially to then enter the collecting section 39 in the form of a liquid coffee essence via the filter-type wall part 40 and to flow into a receptacle 9 located underneath as a freshly brewed coffee beverage via the beverage outlet 7. The rotational speed of the screw shaft 10 is preferably selected so that the proportion of coffee powder in each case is extracted in all during approximately 25-30 secs. Shortly before the desired quantity of the coffee beverage is prepared, grinding is firstly halted and then after a predefined time interval the brew water feed is stopped. To achieve optimum utilization of ground coffee powder the brew water feed into the brewing area 36 is preferably not stopped until no more coffee powder is in the funnel-shaped inlet region. It needs to be assured, however, that sufficient compacted coffee powder is still in the sealing zone before the brew water feed is stopped, so that sealing off of the brewing area 36 at the inlet end is assured up to the end of the brewing process.

Preferably the screw shaft 10 continues to rotate after the brew water feed is stopped, until all coffee powder has been removed from the cylindrical portion 20 and no more coffee powder exists in the individual zones 23, 24, 25 of the brewer 3. Since the volume of the brewing area 36 and particularly the adjoining sealing area 35 is selected relatively small, only a very small quantity of unused, i.e., non-extracted coffee powder is removed from the sealing area 35 and, where necessary the brewing area 36. If need be, on removing the coffee powder from the cylindrical portion 20 after stoppage of the brew water feed, a predefined delay can be programmed since in preparation cycles quickly following each other in sequence the coffee powder need not be removed from the cylindrical portion 20 every time but instead for reasons of hygiene not before no more coffee beverage is prepared for a certain duration of, for example, a few minutes.

Compacting the partly extracted coffee powder in the extraction zone 25 has the advantage that the coffee powder is additionally extracted thereby, in that the liquid is extracted from the coffee powder. Thus, compacting the coffee powder in the extraction zone 25 ensures, on the one hand, sealing off of the brewing area 36 at the outlet end and, on the other, improving extraction of the coffee powder. At the outlet end the extracted coffee powder is directed by the baffle 41 into the bin 8.

With the apparatus in accordance with the invention large quantities of a high-quality coffee beverage can now be prepared in continual brewing, whereby the volume, i.e., the quantity of the coffee beverage to be prepared can be varied over a very broad range. At the same time the quantity of powder extracted for preparation of the corresponding serving can also be adapted to the water quantity. Thus the apparatus now makes it possible, for example, to prepare a very small espresso with a volume of just a few milliliters, whilst on the other hand, several liters of fresh espresso coffee can also be prepared continually, but in any case, i.e., irrespective of the quantity of the hot beverage made, the strength of the coffee is freely selectable over a broad range.

In addition to this, by altering various parameters the prepared hot beverage can be tailored in addition to the parameters as are variable in other generic devices such as, for example grinding fineness or grain size of the coffee powder, degree of compaction of the coffee powder, extraction duration, brew water temperature and brew water pressure by the apparatus in accordance with the invention now making it possible to vary even further operating parameters. For instance, by varying the rotational speed of the screw shaft the degree of extraction of the coffee powder and thus the taste, strength, caffeine content as well as, where necessary, the appearance of the served coffee beverage can all be varied.

In addition to this, by axial displacement of the brew water conduit 31 it can be determined in which region of the brewing zone the brew water is to enter the coffee powder which is particularly appreciated when the flights 13 of the screw shaft 10 comprise a differing pitch along the brewing zone. In this case axial displacement of the brew water conduit 31 permits introducing the brew water at positions into the brewing area 36 in which the coffee powder is compacted differently strongly. The position at which water is added influences the quality of the coffee beverage because of the difference in compacting of the coffee powder and the extraction time. Positioning the filter sieve relative to the brew water being adding permits influencing the filter path and thus also the filter time.

Yet another advantage of the apparatus as described as compared to a prior art apparatus working batch-wise is that the coffee powder is now homogenously extracted during the complete preparation process, i.e., the coffee beverage flowing from the beverage outlet is always the same in color, taste and aroma. In addition to this, the quantity of prepared coffee beverage is independent of the size of the brewing area 36.

Still another appreciable advantage of the apparatus is that the actual time needed for preparation is now relatively short since unlike conventional coffee makers the coffee beans need to be ground in their entirety but, now, just the quantity of coffee powder needs to be made available as is needed to fill the brewing area 36 as well as the two adjoining areas 35, 37. Now, when preparing several servings within short time intervals the "filling time" is completely eliminated, because in this case practically continual operation is possible since after preparation of a serving only the brew water feed needs to be halted shortly without the coffee powder needing to be completely removed from the brewing area 36 and from the sealing area 35 at the inlet end.

Where necessary, the screw shaft can perform a few rotations after the brew water feed has been stopped, so that the already wetted coffee powder is removed from the brewing area which is simultaneously filled with fresh coffee powder. In addition to this, the dead time for ejecting the spent puck at the end of each preparation process is eliminated when preparing several servings in a sequence of brief time intervals, since deposing the spent puck is done continually during the preparation process. Thus when preparing several servings within in a sequence of brief time intervals the time needed for filling and disposal as needed in batch wise working devices is now eliminated. This is why as compared to known devices the apparatus in accordance with the invention can achieve a substantially higher "cup capacity". Since the coffee powder is extracted in the extraction zone 25 the efficiency is also improved by less coffee powder for a certain quantity of coffee beverage being needed for at least the same quality. In conclusion, there is the further advantage that the quantity of water and particularly the quantity of powder per volume of water to be brewed is now freely selectable over a very broad range so that the strength and quality of the served coffee beverage can now be varied irrespective of its volume. In other words, it is now possible with this apparatus to adapt the quantity of powder to the quantity of water with substantial advantages when preparing a large servings.

Since the coffee powder is continually on the move this prevents channels being formed in the coffee powder with hydraulic "short-circuits" which are known to result in irregular and incomplete extraction of the coffee powder held in the brewing area.

Figures 3, 6:
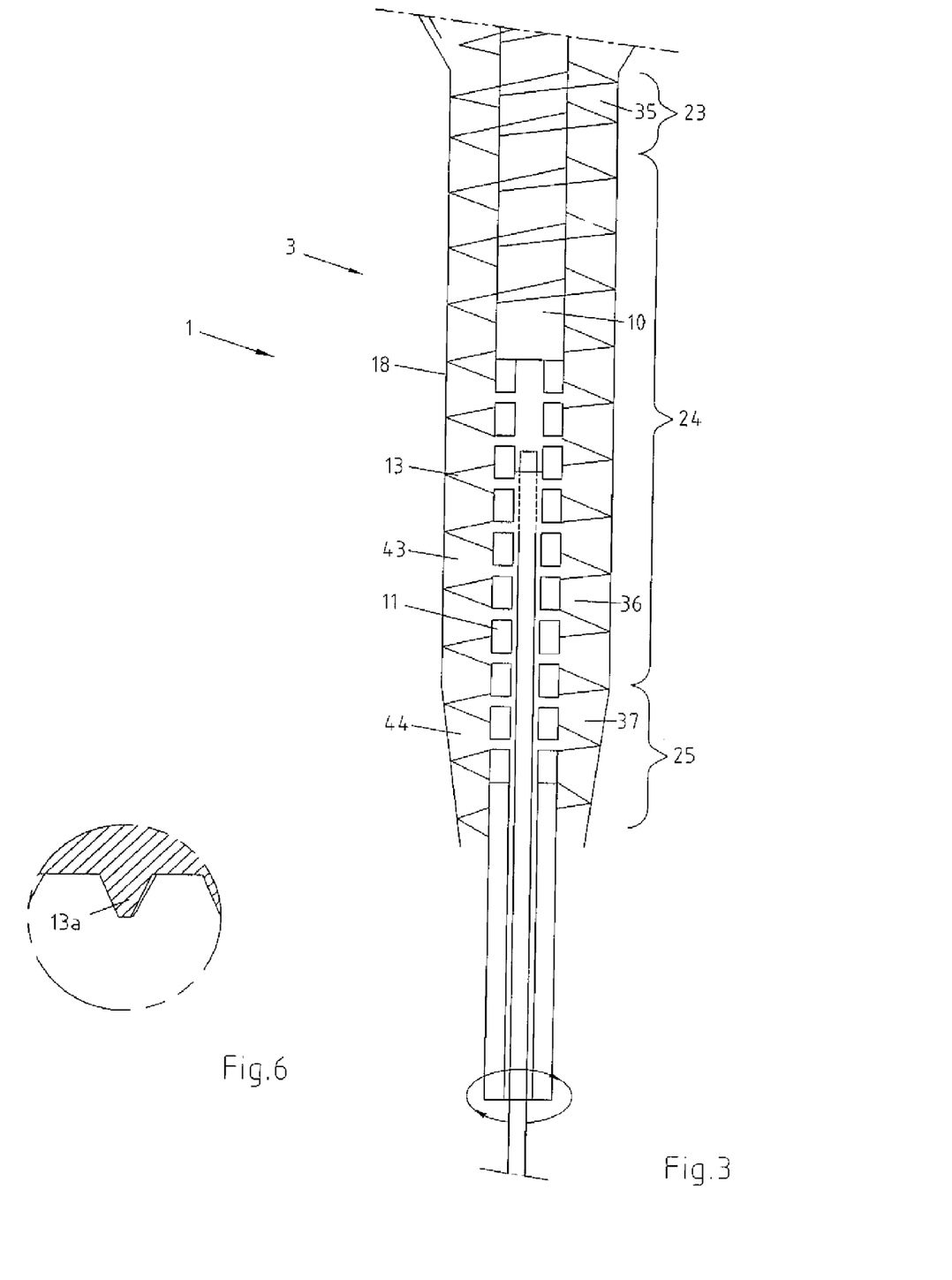
FIG. 3 is an illustration of an alternative example embodiment of the apparatus.
FIG. 6 is an illustration of preferred screw flight geometry in cross-section.

Referring now to FIG. 3 there is illustrated an alternative embodiment of an apparatus in accordance with the invention. In this example, instead of a diminishing pitch of the screw shaft flights in forming a sealing zone, the area 43, 44 between the housing 18 and the screw shaft member 11 in the region of the extraction zone 25 is diminished. Concretely, the diameter of the housing 18 surrounding the screw shaft 10 is diminished in the region of the extraction zone 25 in the direction of delivery of the screw shaft 10. It is understood that the geometry of the flights 13 in the extraction zone 25 is adapted to the geometry of the conically tapered housing 18. By the diameter of the housing 18 being conically tapered in the direction of delivery the substance is in turn compacted in the region of the extraction zone 25 so that the essence is extracted. The pitch of the flights 13 between the brewing zone 24 and extraction zone 25 in this case does not need to vary, it instead can remain constant. However, in this embodiment too, the pitch of the flights 13 may also be varied in accordance with what is wanted.

Instead of tapering the housing 18 conically the diameter of the screw shaft member 11 could be flared in the direction of delivery such that the space between the housing 18 and the actual screw shaft member 11 is in turn is reduced in size in the region of the extraction zone 25, even when the housing is configured cylindrical.

In addition to the already cited operation parameters there are also other apparatus parameters which can be used to influence the hot beverage to be prepared. For example, the absolute and/or the relative pitch of the screw shaft member 11 can be varied in the individual zones or therebetween. Indeed, the quality of the hot beverage to be brewed can also be influenced by the length of the brewing zone and its relevant diameter.

It is understood that the apparatus as described hitherto merely serves as example and that embodiments deviating therefrom are achievable in the scope of the invention. For example, the brew water could be introduced from outside into the brewing area 36 and the brewed coffee beverage dispensed via the hollow shank of the screw shaft member 11 or via a conduit accommodated therein. It is just as possible that the brew water is introduced into the brewing area 36 at an angle instead of radially. Likewise the brewing area 36 could be configured conical.

The present apparatus is particularly suitable for preparing espresso coffee. But, of course, it is just as possible to use it for the preparation of other hot beverages such as, for example, tea, soups, etc.

As an alternative to the example embodiment described hitherto in which the brew water is introduced into the brewing zone by means of a pump at high pressure, example embodiments of devices are just as possible without a pump. Compacting the particulate substance or coffee powder in the extraction zone at the outlet end opens up new possibilities by the brew water not necessarily needing to be fed to the brewing zone at high pressure. Instead, all that needs to be assured is that the coffee powder in passing through the brewing zone is thoroughly wetted by the in-feed of brew water. In this case the brewing zone is not necessarily the zone in which the coffee powder is also actually brewed and extracted. Instead, brewing zone in this case is understood to be a zone in which the coffee powder is only partly wetted or, at the most, partly extracted by the in-feed of hot brew water.

When a pump for forced feed of the brew water is to be eliminated, a controllable valve could be provided for starting and stopping the brew water in-feed, for example, instead of the pump. The brew water could be supplied by the force of gravity from a tap water tank located above the apparatus or the apparatus or water heater could be directly connected to a tap water/mains conduit in utilizing the water pressure existing in any case in the tap water conduit for the supply of the brew water. The actual extraction process would then mainly take place in the extraction zone where by compacting the coffee powder the liquid coffee essence would be extracted from the coffee powder. If need be, this liquid coffee essence which is highly concentrated, could be diluted with water to achieve the wanted typical concentration of the served coffee beverage. Diluting in this way could also be done with water as is directed non-pressurized through the already spent puck as in filter coffee.

If need be, the delivery pressure of the pump may also be reduced along with a reduction in the pitch of the flight in the direction of delivery so that compacting the coffee powder is increased in the direction of delivery which ultimately likewise results in the desired good extraction of the coffee powder. In conclusion the apparatus may also be operated batch wise or quasi continually by the coffee powder being forwarded into the brewing area 36 and the screw shaft then halted so that extraction is then done as usual and the spent coffee powder discharged as a puck. Unlike the prior art apparatus working batch wise in which the in-feed of the fresh powder is in the direction opposite to that of discharging the spent puck, the in-feed of the particulate substance into and out of the brewing zone is in one and the same direction in the apparatus in accordance with the invention.

Figure 4:
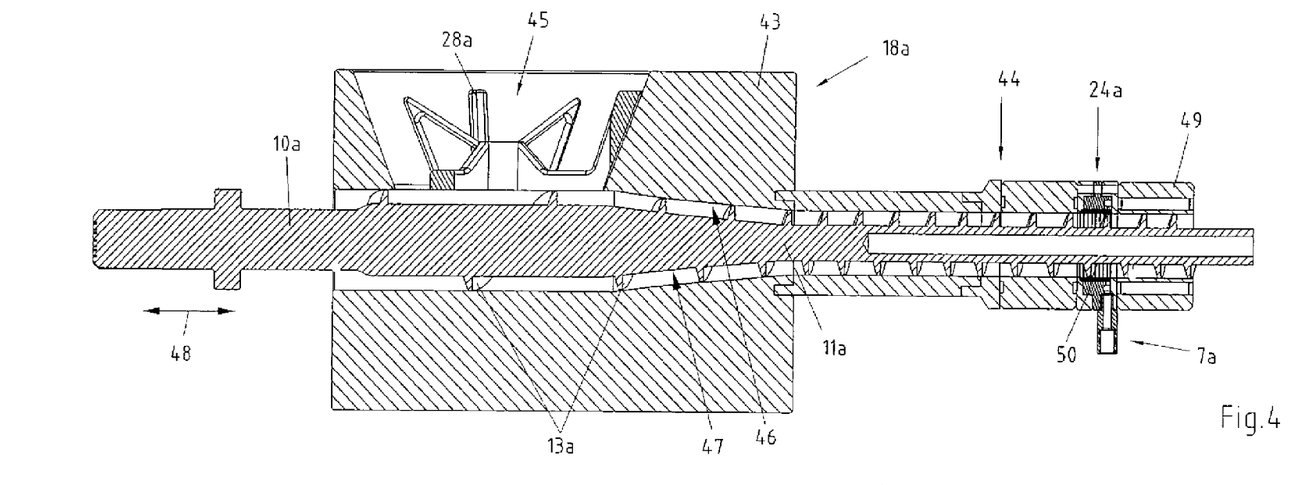
FIG. 4 is an illustration of a preferred example embodiment of the apparatus.

Referring now to FIG. 4 there is illustrated a preferred example embodiment of the apparatus in longitudinal section wherein like or similar parts to those of the previous example embodiment are identified by the reference numerals being supplemented "a". In this case the apparatus is arranged horizontally. The housing 18a in the present example is formed by a rear housing part 43 and a front housing part 44. The rear housing part 43 is configured as a housing block whilst the front housing part 44 is designed tubular in comprising a substantially hollow cylindrical interior. The rear housing part 43 is provided with an inlet portion 45 for the in-feed of the ground coffee powder. Arranged in this inlet portion 45 is an agitator/wiper 28. Downstream of the inlet portion 45 the rear housing part 43 is provided with a conically tapered intake zone 46 in the direction of delivery of the screw shaft 10a.

It is evident that the screw shaft 10a comprises an intake portion 47 adapted to the contour of the intake zone 46, the intake portion 47 being likewise conically tapered in the direction of delivery. The screw shaft 10a is axially displaceable relative to the housing as is indicated by a 48, it being basically irrespective whether the housing, particularly the area 43 or the screw shaft 10a themselves are configured displaceable. As shown in FIG. 4 the screw shaft 10a is in its front-most position in which there is practically no "daylight" radially between the outer shell of the screw flights 13a and the inner side of the area 43. The front housing part 44 comprises an end portion 49 somewhat larger in outer diameter in the direction of the outlet end, it being in this end portion 49 that the brewing zone 24a is arranged from which an 7a leads away radially downwards.

The brewing zone 24a is provided with a filter device 50 comprising a plurality of filter disks, each of which is slotted radially with a cross-section selected to retain the individual particles of the ground coffee. Instead of individual filter disks a spring filter may also be put to use, for example, comprising a coil spring element, the individual windings of which come into contact with each other and are likewise provided slotted. If need be, a pressure regulating valve may be further interposed between the brewing zone 24a and the outlet, this valve first opening when a predefined overpressure is attained.

Figure 5:
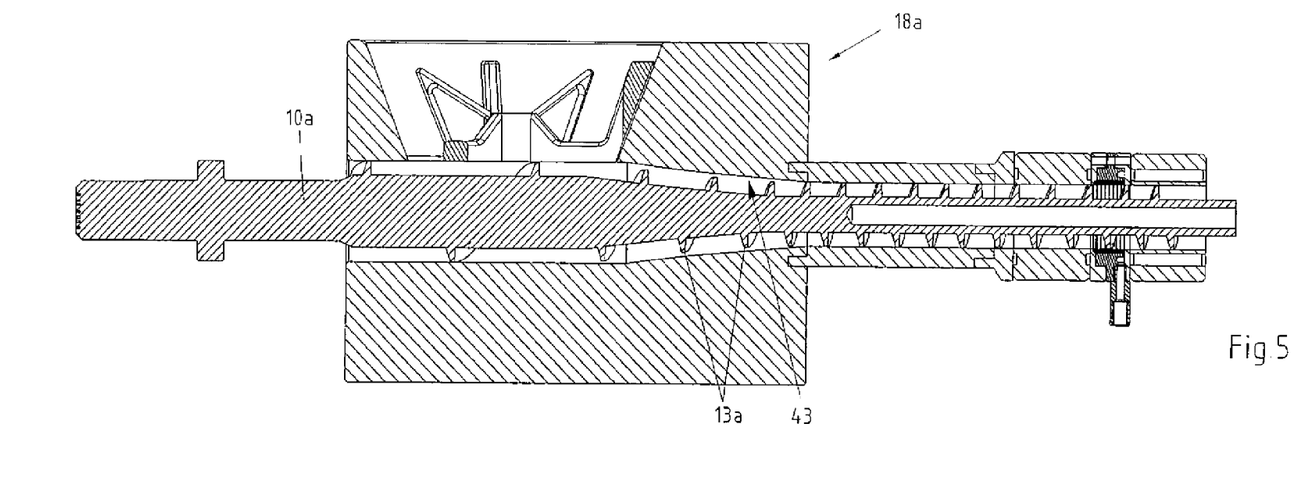
FIG. 5 is an illustration of the apparatus as shown in FIG. 4 with an axially displaced delivery member.

Referring now to FIG. 5 there is illustrated the apparatus as shown in FIG. 4 but with the screw shaft 10a now displaced rearwards axially relative to the housing 18a so that radial "daylight" exists between the outer shell of the screw flights 13a and the inner side of the housing 43. This results in delivery in the intake portion being reduced, causing the degree to which the coffee powder is compacted in the subsequent zones to be reduced. By axial displacement of the screw shaft 10a relative to the housing 18a the beverage to be brewed can be directly influenced thereby. The degree to which the coffee powder is compacted determines the level of the water pressure as can be depleted across the filter cake. This in turn directly influences the degree of extraction and thus the color, taste and strength of the served coffee beverage.

It is understood that instead of displacing the screw shaft 10a axially, it is just as possible to achieve axial displacement of the housing 18a with ultimately the same result.

The embodiment of the screw shaft shown in which the degree with which the coffee powder is compacted can be varied by means of the pitch of the flight has, as compared to other variants, the advantage that no dead zones materialize in which coffee powder residues can collect or which have no through flow of brew water, i.e., the smooth transitions in the achievement as proposed eliminate zones with a poor through flow in which the powder collects. Apart from this the screw shaft has a self-cleaning effect.

Referring now to FIG. 6 there is illustrated in conclusion a preferred screw flight geometry in cross-section on a magnified scale. As evident, the screw flights 13a have a trapezoidal cross-section. This geometry optimizes compaction of the powder by producing an additionally force component which urges the coffee powder outwardly against the inner side of the housing shell, increasing the friction at the shell which in turn results in higher compaction of the powder whilst, in addition, promoting the self-cleaning effect of the screw shaft.

What is claimed is:

1. An apparatus (1) for the preparation of hot beverages by brewing a water-extractable particulate substance, comprising:

a water heater (6);

a pump (5) for feeding pressurized brew water into a brewing zone (24);

a particulate substance delivery member enclosed at least in part by a housing (18), said delivery member including a screw shaft (10) provided with flights (13) for feeding the particulate substance through the brewing zone (24); and an extraction zone (25) downstream of the brewing zone (24) in which the particulate substance is compacted and the essence thereof extracted; and a sealing zone upstream of the brewing zone configured to compact the particulate substance to substantially maintain the pressure of the pressurized brew water within the brewing zone, wherein the screw shaft (10) extends at least along the sealing zone, the brewing zone (24) and the extraction zone (25), and further wherein the pitch of the flights (13) in the region of the extraction zone (25) is smaller than the pitch of the flights in the region of the brewing zone (24).

2. The apparatus as set forth in claim 1, wherein the pitch of the flights (13) is less in the region of the sealing zone is smaller than the pitch of the flights in the region of the brewing zone (24).

3. The apparatus of claim 1, further comprising an intake zone (46) in which the housing (18a) enclosing the screw shaft (10a) is conically tapered, and wherein the screw shaft (10a) includes an intake portion (47) adapted to the contour of the intake zone defined by said housing.

4. The apparatus as set forth in claim 3, wherein the screw shaft (10a) and the housing (18a) are axially displaceable relative to each other.

5. The apparatus of claim 1, wherein the pitch of the flights (13) in the region of the extraction zone (25) is configured such that the substance wetted with brew water or partly extracted in the brewing zone is extracted or served extracted in the extraction zone (25).

6. The apparatus of claim 1, wherein in the pitch of the flights in the extraction zone (25) are configured such that due to compaction of the substance a higher hydrostatic pressure exists in the extraction zone than in the brewing zone (24).

7. The apparatus of claim 1 wherein the brewing zone (24) includes a brewing area (36) configured at least in partially cylindrical or conical, the particulate substance being fed to the brewing area (36) substantially axially whilst the brew water (B) is supplied to the brewing area (36) substantially radially and/or the liquid essence is discharged therefrom radially.

8. The apparatus as set forth in claim 7, wherein the screw shaft (10) is configured as a hollow shaft and provided with an interior (12) which is connected via passageways (14) to an outer shell of the screw shaft (10).

9. The apparatus as set forth in claim 8, wherein the screw shaft (10) is provided along the brewing area (36) with a plurality of passageways (14).

10. The apparatus as set forth in claim 8, wherein the interior (12) of the screw shaft (10) is configured for feeding brew water (B) or for discharging the liquid essence from the brewing area (36).

11. The apparatus as set forth in claim 8 further comprising a brew water conduit (31) leading into the interior (12) of the screw shaft (10), the brew water conduit (31) being provided with at least one outlet (33) via which brew water (B) can be introduced into the interior (12) of the screw shaft (10).

12. The apparatus of claim 1, wherein the screw shaft (10) is enclosed by the housing (18) thereby defining different zones (23, 24, 25) and differing areas (35, 36, 37) therealong, at least one area being a sealing area (35) at the inlet end being created in the direction of delivery of the screw shaft (10) upstream of the brewing area (36) and at least one area being the extraction area (37) at the outlet end being created downstream of the brewing area (36).

13. The apparatus as set forth in claim 12, wherein the extraction zone (25) is configured as a sealing zone at the outlet end to substantially maintain the pressure of the pressurized brewing water within the brewing zone.

14. The apparatus as set forth in any of the claim 7, wherein the volume of the brewing area (36) is selected such that only a fraction of the quantity of substance needed for preparing a beverage serving can be accommodated therein.

15. The apparatus of claim 1, wherein the region of the extraction zone (25) defines a collecting section (39) for collecting the liquid beverage essence extracted in the extraction zone (25), the collecting section (39) being connected to a beverage outlet (7).

16. The apparatus as set forth in claim 1, wherein the screw flights (13a) have a substantially trapezoidal cross-section.

17. An apparatus (1) for the preparation of hot beverages by brewing a water-extractable particulate substance, comprising:

a water heater (6);

a pump (5) for feeding heated brew water into a brewing zone (24);

an extraction zone (25) downstream of the brewing zone (24) in which the particulate substance is compacted and the essence thereof extracted;

a particulate substance delivery member including a screw shaft (10) provided with flights (13) for feeding the particulate substance into and out of the brewing zone (24) in a common direction, wherein the screw shaft (10) extends at least along the brewing zone (24) and along the extraction zone (25), and is configured as a hollow shaft provided with an interior (12) which is connected via passageways (14) to an outer shell of the screw shaft (10), and wherein the pitch of the flights (13) in the region of the extraction zone (25) is smaller than the pitch of the flights in the region of the brewing zone (24); and a brew water conduit (31) leading into the interior (12) of the screw shaft (10), the brew water conduit (31) being provided with at least one outlet (33) via which brew water (B) can be introduced into the interior (12) of the screw shaft (10), wherein the brew water conduit (31) is adjustable axially relative to the screw shaft (10) such that the region in which the brew water is introduced is variable.

18. An apparatus (1) for the preparation of hot beverages by brewing a water-extractable particulate substance, comprising:

a water heater (6);

a pump (5) for feeding heated brew water into a brewing zone (24);

an extraction zone (25) downstream of the brewing zone (24) in which the particulate substance is compacted and the essence thereof extracted; and a particulate substance delivery member enclosed at least in part by a housing (18), said delivery member including a screw shaft (10) provided with at least one flight (13) for feeding the particulate substance into and out of the brewing zone (24) in a common direction, wherein the screw shaft (10) extends at least along the brewing zone (24) and along the extraction zone (25), and further wherein the pitch of the flights (13) in the region of the extraction zone (25) is smaller than the pitch of the flights in the region of the brewing zone (24), wherein the screw shaft (10) is enclosed by the housing (18) thereby defining different zones (23, 24, 25) and differing areas (35, 36, 37) therealong, at least one area being a sealing area (35) at the inlet end being created in the direction of delivery of the screw shaft (10) upstream of the brewing area (36) and at least one area being the extraction area (37) at the outlet end being created downstream of the brewing area (36), further wherein the sealing area (35) defines a volume that is smaller than a volume defined by the brewing area (36).

* * * * *